US009386039B2

(12) United States Patent
Sasaki

(10) Patent No.: US 9,386,039 B2
(45) Date of Patent: Jul. 5, 2016

(54) SECURITY POLICY ENFORCEMENT SYSTEM AND SECURITY POLICY ENFORCEMENT METHOD

(75) Inventor: Takayuki Sasaki, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/822,875

(22) PCT Filed: Nov. 24, 2011

(86) PCT No.: PCT/JP2011/077010
§ 371 (c)(1),
(2), (4) Date: Mar. 13, 2013

(87) PCT Pub. No.: WO2012/101893
PCT Pub. Date: Aug. 2, 2012

(65) Prior Publication Data

US 2013/0174218 A1 Jul. 4, 2013

(30) Foreign Application Priority Data

Jan. 25, 2011 (JP) ................................ 2011-013392

(51) Int. Cl.
*H04L 29/06* (2006.01)
*G06F 21/62* (2013.01)

(52) U.S. Cl.
CPC ............ *H04L 63/20* (2013.01); *G06F 21/6218* (2013.01); *H04L 63/10* (2013.01); *H04L 63/102* (2013.01)

(58) Field of Classification Search
None
See application file for complete search history.

(56) References Cited

U.S. PATENT DOCUMENTS 5,355,474 A * 10/1994 Thuraisngham et al. ..... 707/759
2007/0143823 A1* 6/2007 Olsen ................. G06F 21/6218 726/1
2009/0012987 A1* 1/2009 Kaminsky et al. ............ 707/102
2011/0113467 A1* 5/2011 Agarwal et al. ................... 726/1
2012/0110128 A1* 5/2012 Aaron et al. ................. 709/219

FOREIGN PATENT DOCUMENTS

CN 101047701 A 10/2007
GB 2411554 A * 8/2005

(Continued)

OTHER PUBLICATIONS

Communication dated Nov. 3, 2015, from the State Intellectual Property Office of People's Republic of China in counterpart Application No. 201180062623.6.

(Continued)

*Primary Examiner* — Hadi Armouche
*Assistant Examiner* — Andrew Steinle
(74) *Attorney, Agent, or Firm* — Sughrue Mion, PLLC

(57) ABSTRACT

Provided is a system which distributes a processing load of security measures and enforce a security policy to be applicable to a large system. Policy information indicating a security measure to be executed on user information transmitted from a client to a server is stored in a policy storing section. Measure arrangement information indicating the security measure executable in each of a plurality of policy enforcement sections is stored in a measure-arrangement storing section. One or more of the policy enforcement sections are selected on the basis of the policy information and the measure arrangement information. Each of the one or more policy enforcement sections executes the security measure on the user information and outputs, on the basis of a selection result, the user information to the other policy enforcement sections among the one or more policy enforcement sections or to the server.

8 Claims, 14 Drawing Sheets

(56) References Cited

FOREIGN PATENT DOCUMENTS

| | | | |
|---|---|---|---|
| JP | 2003-174483 | A | 6/2003 |
| JP | 2007-129481 | A | 5/2007 |
| JP | 2007-184724 | A | 7/2007 |
| JP | 2007-336220 | A | 12/2007 |
| JP | 2008-141352 | A | 6/2008 |

OTHER PUBLICATIONS

Sasaki, Takayuki, Domain Virtualization for Secure Collaboration, FIT2007 Sixth Forum on Information Technology, Japan, information Processing Society of Japan, the Institute of Electronics, Information and Communication Engineers, Aug. 22, 2007, L-030, p. 696-70.

Ogawa, Ryuichi, et al., Access policy management architecture for virtual server consolidation systems, The technical Report of the Proceeding of the institute of Electronics, Information and Communication Engineers, Japan, The Institute of Electronics, Information and Communication Engineers, Jun. 24, 2010, vol. 110, No. 113, p. 93-100.

Communication dated Jan. 12, 2016, from the Japanese Patent Office in counterpart application No. 2012-554625.

* cited by examiner

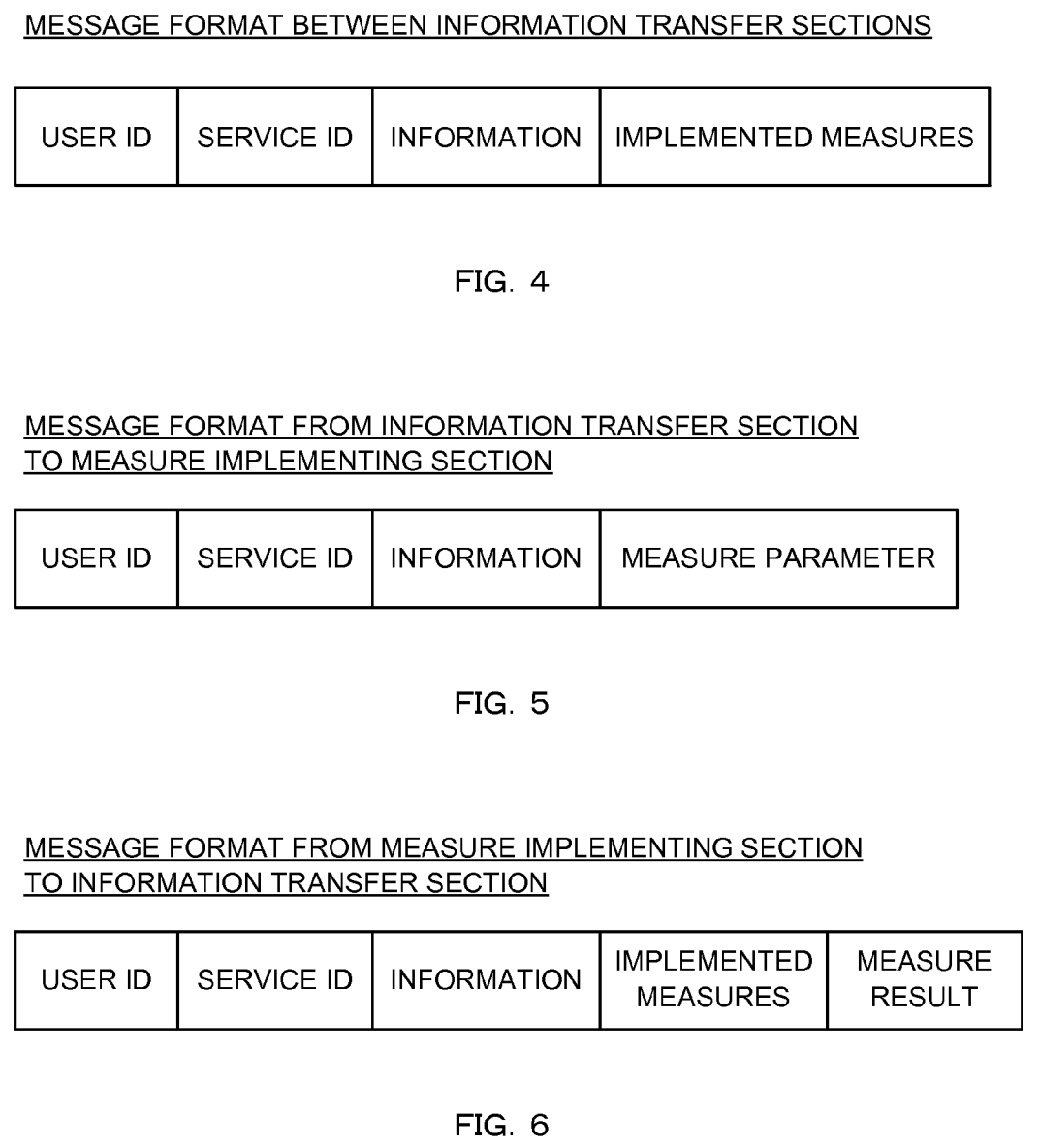

MESSAGE FORMAT BETWEEN INFORMATION TRANSFER SECTIONS

| | | | |
|---|---|---|---|
| USER ID | SERVICE ID | INFORMATION | IMPLEMENTED MEASURES |

FIG. 4

MESSAGE FORMAT FROM INFORMATION TRANSFER SECTION TO MEASURE IMPLEMENTING SECTION

| | | | |
|---|---|---|---|
| USER ID | SERVICE ID | INFORMATION | MEASURE PARAMETER |

FIG. 5

MESSAGE FORMAT FROM MEASURE IMPLEMENTING SECTION TO INFORMATION TRANSFER SECTION

| | | | | |
|---|---|---|---|---|
| USER ID | SERVICE ID | INFORMATION | IMPLEMENTED MEASURES | MEASURE RESULT |

FIG. 6

POLICY DB

| USER ID | SERVICE ID | NECESSARY MEASURES LIST |
|---|---|---|
| USER A | RECOMMEND SERVICE | ANONYMIZATION, CONVERSION INTO PROVISIONAL ID |
| USER A | BLOG SERVICE | ANTI-VIRUS |
| USER B | BLOG SERVICE | ANTI-VIRUS, LOG RECORDING |
| ⋮ | ⋮ | ⋮ |

FIG. 7

MEASURE ARRANGEMENT DB

| POLICY ENFORCEMENT SECTION | MEASURES LIST |
|---|---|
| 1 | ANONYMIZATION |
| 2 | LOG RECORDING, ANTI-VIRUS |
| 3 | CONVERSION INTO PROVISIONAL ID, ANTI-VIRUS |
| ⋮ | ⋮ |

FIG. 8

LOAD STATE DB

| POLICY ENFORCEMENT SECTION | LOAD(%) |
|---|---|
| 1 | 80 |
| 2 | 70 |
| 3 | 50 |
| ⋮ | ⋮ |

FIG. 9

MESSAGE FORMAT FROM POLICY ENFORCEMENT SECTION TO POLICY

| POLICY ENFORCEMENT SECTION ID | USER ID | SERVICE ID | IMPLEMENTED MEASURES |
|---|---|---|---|

FIG. 10

MESSAGE FORMAT FROM POLICY DETERMINING SECTION TO POLICY

| MEASURES, PARAMETER OF MEASURES | ··· | MEASURES, PARAMETER OF MEASURES | TRANSFER DESTINATION OF INFORMATION |
|---|---|---|---|

FIG. 11

ORDER CONSTRAINT DB

| MEASURES |
| --- |
| LOG RECORDING → CONVERSION INTO PROVISIONAL ID |
| ANTI-VIRUS → ENCRYPTION |
| ⋮ |

FIG. 15

MESSAGE FORMAT FROM POLICY DETERMINING SECTION TO POLICY

| POLICY ENFORCEMENT SECTION | MEASURES |
|---|---|
| 1 | NONE |
| 2 | ANONYMIZATION |
| 3 | ANTI-VIRUS |

FIG. 17

SECURITY POLICY ENFORCEMENT SYSTEM AND SECURITY POLICY ENFORCEMENT METHOD

CROSS REFERENCE TO RELATED APPLICATIONS

This application is a National Stage of International Application No. PCT/JP2011/077010 filed Nov. 24, 2011, claiming priority based on Japanese Patent Application No. 2011-013392 filed Jan. 25, 2011, the contents of all of which are incorporated herein by reference in their entirety.

BACKGROUND

The present invention relates to a security policy enforcement system and a security policy enforcement method.

In recent years, a service provision form called cloud has been spread. The cloud is a model in which a platform provider provides a service provider with a platform for building a service and the service provider builds an own service on the platform and provides users with the service.

In such an environment, respective service providers implement services with security functions in order to protect the services from information leaks and attacks. However, since the service providers independently implement the security functions, there is a problem in that costs are high. Further, since functions of the services and the security functions are closely related, there is a problem in that it is difficult to update the security functions.

In order to solve these problems, it is desired that, rather than respective services having security functions, a platform of a service has a security function and, if a service provider simply sets a security policy, the service is protected by the platform. For that purpose, several systems have been proposed.

For example, in a system disclosed in Patent Document 1, a network apparatus arranged between a client and a server monitors a network packet transmitted from the client and performs access control, whereby security measures are implemented.

In a system disclosed in Patent Document 2, a router between a client and a server hooks communication and transfers a packet to a security apparatus such as a firewall or an anti-virus, whereby security measures are implemented.

Further, general security measures include a firewall for performing filtering of packets, an IDS (Intrusion Detection System) for detecting intrusion, and an IPS (Intrusion Prevention System) for preventing intrusion.

Patent Document 1: Patent Publication JP-A-2008-141352

Patent Document 2: Patent Publication JP-A-2007-336220

However, in the systems explained above, a large environment is not assumed and a load is imposed on a specific apparatus. Therefore, the systems cannot be applied to a large system. Specifically, in the system described in Patent Document 1, a general firewall, and the IDS or the IPS, network traffic concentrates on an apparatus that takes security measures. In the system described in Patent Document 2, although apparatuses that take security measures are distributed, traffic of a network concentrates on an apparatus that calls the apparatuses (an apparatus that allocates traffic) and it is difficult to extend the ability of security measure processing.

SUMMARY

The present invention has been devised in view of such circumstances and an object of the present invention is to distribute a processing load of security measures and enforce a security policy to be applicable to a large system.

A security policy enforcement system according to an aspect of the present invention includes: a plurality of policy enforcement sections configured to execute a security measure on user information transmitted from a client to a server; a policy storing section configured to store policy information indicating the security measure to be executed on the user information; a measure-arrangement storing section configured to store measure arrangement information indicating the security measure executable in each of the policy enforcement sections; and a policy determining section configured to select, on the basis of the policy information and the measure arrangement information, one or more of the policy enforcement sections that execute the security measure on the user information among the plurality of policy enforcement sections. Each of the one or more policy enforcement sections executes the security measure on the user information and outputs, on the basis of a selection result of the policy determining section, the user information to the other policy enforcement sections among the one or more policy enforcement sections or to the server.

In the present invention, "section" does not simply mean physical means and includes a function of the "section" realized by software. A function of one "section" or apparatus may be realized by two or more physical means or apparatuses or functions of two or more "sections" or apparatuses may be realized by one physical means or apparatus.

According to the present invention, it is possible to distribute a processing load of security measures and enforce a security policy to be applicable to a large system.

DESCRIPTION OF DRAWINGS

FIG. 4 is a diagram showing an example of a message format between information transfer sections.

FIG. 5 is a diagram showing an example of a message format used when the information transfer section calls a measure implementing section.

FIG. 6 is a diagram showing an example of a message format used in a response from the measure implementing section to the information transfer section.

FIG. 7 is a diagram showing an example of a policy DB.

FIG. 8 is a diagram showing an example of a measure arrangement DB.

FIG. 9 is a diagram showing an example of a load state DB.

FIG. 10 is a diagram showing an example of a message format used in an inquiry from the information transfer section to a policy determining section.

FIG. 11 is a diagram showing an example of a message format used in a response from the policy determining section to the information transfer section.

FIG. 15 is a diagram showing an example of an order constraint DB.

FIG. 17 is a diagram showing an example of a message format used in collectively notifying a first policy enforcement section of the order of policy enforcement sections and measures to be implemented by the policy enforcement sections.

DETAILED DESCRIPTION

Embodiments of the present invention are explained below with reference to the drawings.

First Embodiment

Figure 1:
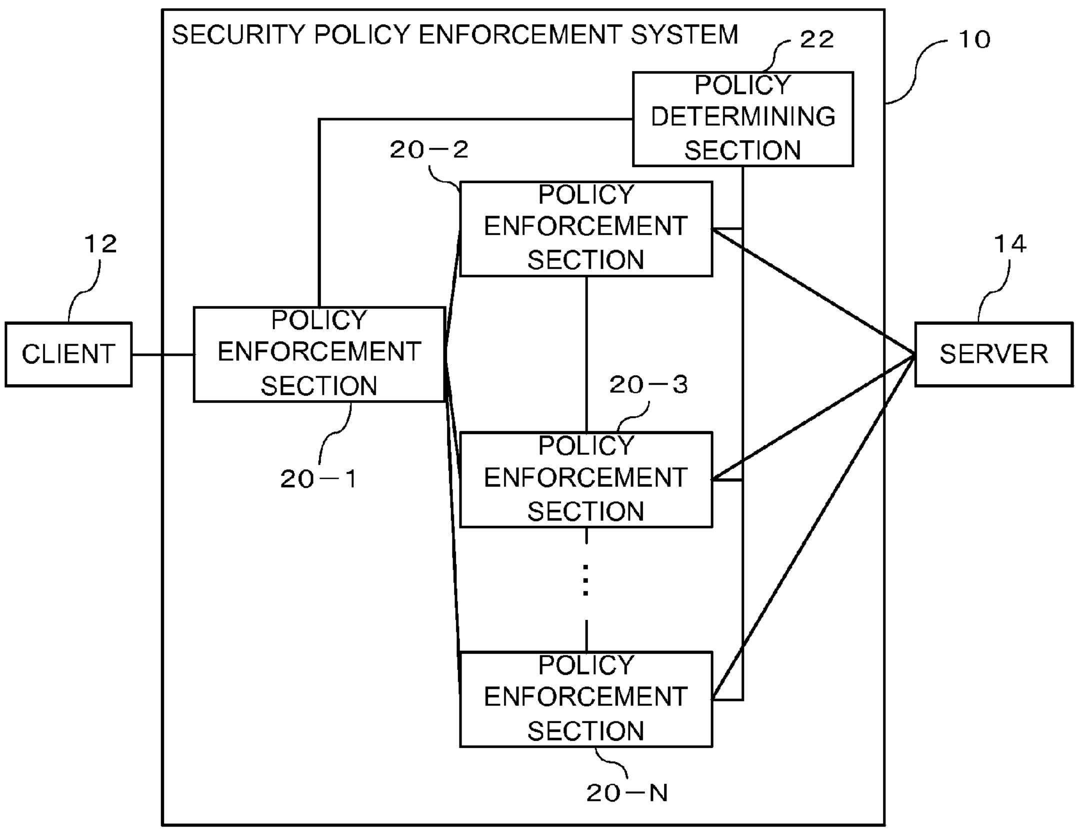
FIG. 1 is a diagram showing a configuration example of a security policy enforcement system.

FIG. 1 is a diagram showing the configuration of a security policy enforcement system according to a first embodiment. A security policy enforcement system 10 is an information processing system that executes security measures corresponding to a security policy when a client 12 uses a service provided from a server 14. The execution of the security measures corresponding to the security policy is called "enforcement" of the security policy. In this embodiment, the security measures are simply represented as "measures" as well.

The client 12 is an information processing apparatus used by a user. The client 12 transmits information (user information) such as location information of the user, a description of a blog, and a document file and a program file to the server 14 via the security policy enforcement system 10. The client 12 can transmit the information to the policy enforcement system 10 using, for example, a Simple Object Access Protocol (SOAP). The client 12 is a computer including, for example, a CPU and a network interface card (NIC). The client 12 can execute an application program for transmitting information. Since the configuration of the client 12 is a general configuration, detailed explanation of the configuration is omitted.

Figure 2:
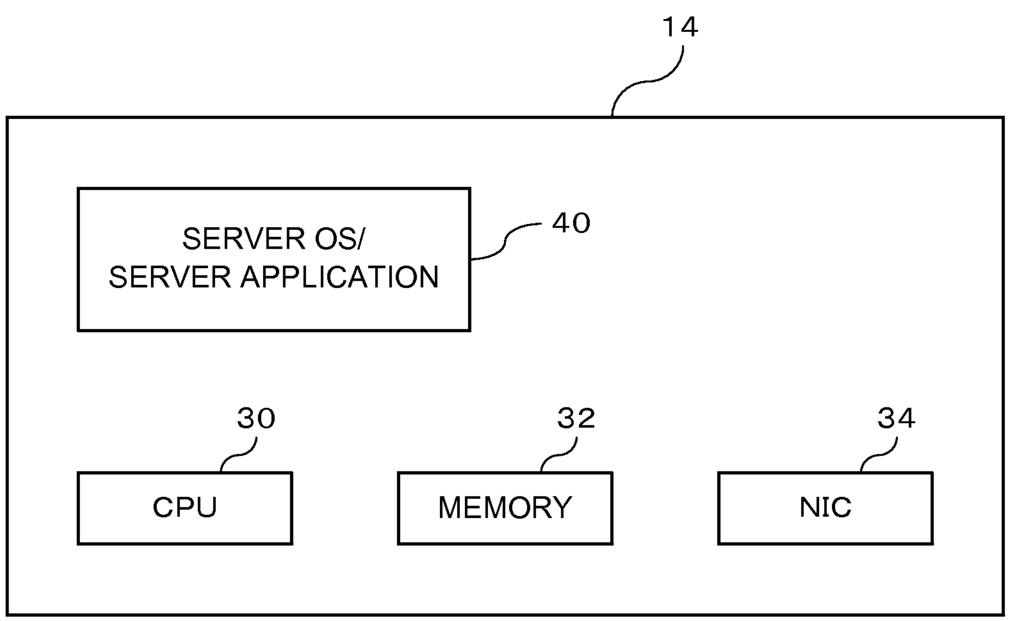
FIG. 2 is a diagram showing a configuration example of a server.

The server 14 is an information processing apparatus that provides, for example, a blog service and a recommendation service. The server 14 receives, via the security policy enforcement system 10, information transmitted from the client 12 and stores the information on the inside of the server 14. The server 14 includes, as shown in FIG. 2, a CPU 30, a memory 32, and a network interface card (NIC) 34. A server OS/server application 40 for providing a service operates on the server 14. Since the configuration of the server 14 is a general configuration, detailed explanation of the configuration is omitted.

As shown in FIG. 1, the security policy enforcement system 10 includes a plurality of policy enforcement sections 20 and a policy determining section 22.

The policy enforcement section 20 is an information processing apparatus that relays information between the client 12 and the server 14 and applies security measures to the information to be relayed. In this embodiment, when it is necessary to distinguish each of the plurality of policy enforcement sections 20, branch numbers are affixed to the reference numeral to represent the policy enforcement sections 20 in such a manner as policy enforcement section 20-1, policy enforcement section 20-2, . . . , and a policy enforcement section 20-N.

The policy determining section 22 is an information processing apparatus that determines, on the basis of a security policy set in advance and information transmitted from the user, through which of the policy enforcement sections 20 the information should be transmitted to the server 14.

Figure 3:
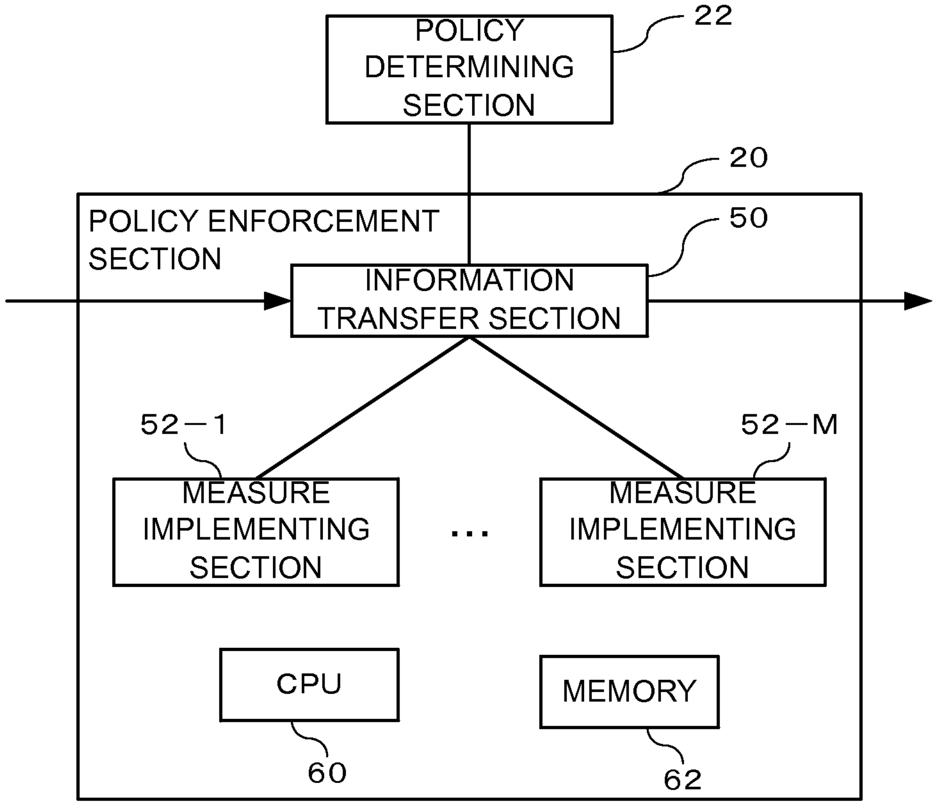
FIG. 3 is a diagram showing a configuration example of a policy enforcement section.

FIG. 3 is a diagram showing a configuration example of the policy enforcement section 20. The policy enforcement section 20 includes an information transfer section 50 and a plurality of measure implementing sections 52. The policy enforcement section 20 further includes a CPU 60 and a memory 62. For example, the CPU 60 executes a program stored in the memory 62, whereby the information transfer section 50 and the measure implementing sections 52 can be realized.

The information transfer section 50 transfers information among the client 12, the other policy enforcement sections 20, and the server 14. Upon receiving information from the client 12 or the information transfer section 50 of another policy enforcement section 20, the information transfer section 50 inquires the policy determining section 22 about security measures to be implemented and a transfer destination of the information. The information transfer section 50 calls the measure implementing section 52 according to an instruction of the policy determining section 22. After the completion of the measure implementation in the measure implementing section 52, the information transfer section 50 transfers the information to the other policy enforcement section 20 or the server 14 according to the instruction of the policy determining section 22. For example, the SOAP can be used as a transfer protocol for the information to the other policy enforcement section 20 or the server 14. The SOAP is an example. The transfer protocol may be other protocols as long as the information can be transferred. For example, inter-process communication can be used as a protocol used when the information transfer section 50 calls the measure implementing section 52. The information transfer section 50 may perform transfer of information and calling of the measure implementing section 52 in a TCP/IP layer using, for example, rewriting of a destination IP address. Similarly, transfer of information and calling of the measure implementing section 52 in an Ethernet (registered trademark) layer may be performed.

Exchange of information between the information transfer sections 50 is performed, for example, in a format shown in FIG. 4. A user ID is an identifier that can uniquely identify a user. A service ID is an identifier that can uniquely identify a service. Information is information transmitted from a client, for example, location information or a description of a blog. In an item of implemented measures, measures implemented for information transmitted from the user are set.

When the information transfer section 50 calls the measure implementing section 52, for example, a format shown in FIG. 5 is used. A user ID, a service ID, and information are the same as those shown in FIG. 4. A measure parameter is a parameter necessary for executing measures. For example, when the measure implementing section 52 performs encryption, an encryption key is set. When the measure implementing section 52 performs anonymization, an indicator of anonymization such as K anonymity or L diversity is set.

The measure implementing section 52 receives information from the information transfer section 50, applies security measure processing specified in advance to the received information, and returns processed information to the information transfer section 50. In this embodiment, when it is necessary to distinguish each of the plurality of measure implementing sections 52, branch numbers are affixed to the reference numeral to represent the measure implementing sections 52 in such a manner as measure implementing section 52-1, measure implementing section 52-2, . . . , and measure implementing section 52-M. The respective measure implementing sections 52 perform different kinds of measure processing. Measures that can be implemented by the policy enforcement sections 20 are different depending on the measure implementing sections 52 arranged in the respective policy enforcement sections 20; for example, the policy enforcement section 20-1 performs encryption and anti-virus and the policy enforcement section 20-2 performs anonymization and log recording.

The measure implementing section 52 is configured to be capable of identifying incorporated security measure processing. For example, the measure implementing section 52 can be configured to have the same name as the incorporated security measure processing. For example, the measure implementing section 52 that performs encryption has a name "encryption". This name is the same as measures described in a security policy. Therefore, if the information transfer section 50 refers to a notification from the policy determining section 22, the information transfer section 50 can uniquely specify which measure implementing section 52 should be called. When it is desired to allocate different names to the measures of the policy and the measure implementing section 52, the policy determining section 22 only has to have a database for converting description of the measures of the policy into a name of the measure implementing section 52. In this case, since the name of the measures described in the policy is converted on the basis of the database, it is possible to specify the measure implementing section 52 that implements the measures.

When the measure implementing section 52 implements measures and returns information to the information transfer section 50, for example, a format shown in FIG. 6 is used. A user ID, a service ID, information, and implemented measures are the same as those shown in FIGS. 4 and 5. In an item of a measure result, it is recorded whether the measure implementing section 52 successfully implemented security measures. When the measure implementing section 52 successfully implemented the measures normally, "success" is set. When the measure implementing section 52 failed in the measures because of some reason, "failure" is set.

The policy determining section 22 includes a policy DB (a policy storing section) in which a security policy (policy information) indicating security measures to be implemented is recorded for each user. The policy determining section 22 determines security measures to be implemented according to the security policy and a transfer destination of information. An example of the policy DB held by the policy determining section 22 is shown in FIG. 7. The policy DB includes a user ID, a service ID, and a necessary measures list. FIG. 7 indicates that, as an example, anonymization and conversion into provisional ID are necessary when a user A uses a recommend service and anti-virus is necessary when the user A uses a blog service. FIG. 7 indicates that the anti-virus and log recording are necessary when a user B uses the blog service. In the example shown in FIG. 7, a simple character string such as recommend service is used as the service ID. However, a service only has to be uniquely identified. For example, a URL may be used as the service ID. The policy DB may include a parameter for measures. For example, when encryption is included in the necessary measures list, a key for encryption may be set in the necessary measures list together with designation of the encryption. As the policy DB, for example, a relational database may be used. If a data amount is small, the policy DB may be implemented as an array in a program.

In addition, the policy determining section 22 includes a measure arrangement DB (a measure-arrangement storing section) in which measure arrangement information indicating what kinds of the measure implementing sections 52 the respective policy enforcement sections 20 hold is recorded as information for determining a transfer destination of information. An example of the measure arrangement DB held by the policy determining section 22 is shown in FIG. 8. The measure arrangement DB includes an ID (identifier) of the policy enforcement section 20 and a list (a measures list) of the measure implementing sections 52 arranged in the policy enforcement section 20. The example shown in FIG. 8 indicates that, for example, the measure implementing section 52 that performs anonymization is arranged in the policy enforcement section 20-1 having ID No. 1. The example shown in FIG. 8 indicates that, for example, the measure implementing section 52-1 that performs log recording and the measure implementing section 52-2 that performs anti-virus are arranged in the policy enforcement section 20-2 having ID No. 2. Like the policy DB, the measure arrangement DB can be implemented as, for example, a relational database or an array in a program.

Further, the policy determining section 22 includes, on the inside, a load state DB (a load-state storing section) in which load information indicating load states of the policy enforcement sections 20 are recorded. An example of the load state DB held by the policy determining section 22 is shown in FIG. 9. The load state DB includes an ID and a load of the policy enforcement section 20. The example shown in FIG. 9 indicates that a load of the policy enforcement section 20-1 having ID No. 1 is 80%. Like the policy DB and the measure arrangement DB, the load state DB can be implemented as, for example, a relational database or an array in a program.

Upon receiving an inquiry from the information transfer section 50 of the policy enforcement section 20, in addition to measures to be implemented by the policy enforcement section 20 at an inquiry source and a parameter of the measures, the policy determining section 22 notifies the policy enforcement section 50 at the inquiry source to which policy enforcement section 20 information is to be transferred next. An algorithm for determining measures to be implemented and a transfer destination of information is explained below. For example, a format shown in FIG. 10 can be used for the inquiry from the information transfer section 50 of the policy enforcement section 20 to the policy determining section 22. A user ID, a service ID, and implemented measures are the same as those shown in FIGS. 4 and 5. Therefore, explanation of the user ID, the service ID, and the implemented measures is omitted. For example, a format shown in FIG. 11 can be used for a reply from the policy determining section 22 to the information transfer section 50 of the policy enforcement section 20. Measures and a parameter of the measures are, for example, encryption and a key for the encryption. In a transfer destination of information, an ID for identifying the policy enforcement section 20 or a service (the server 14) is set.

Figure 12:
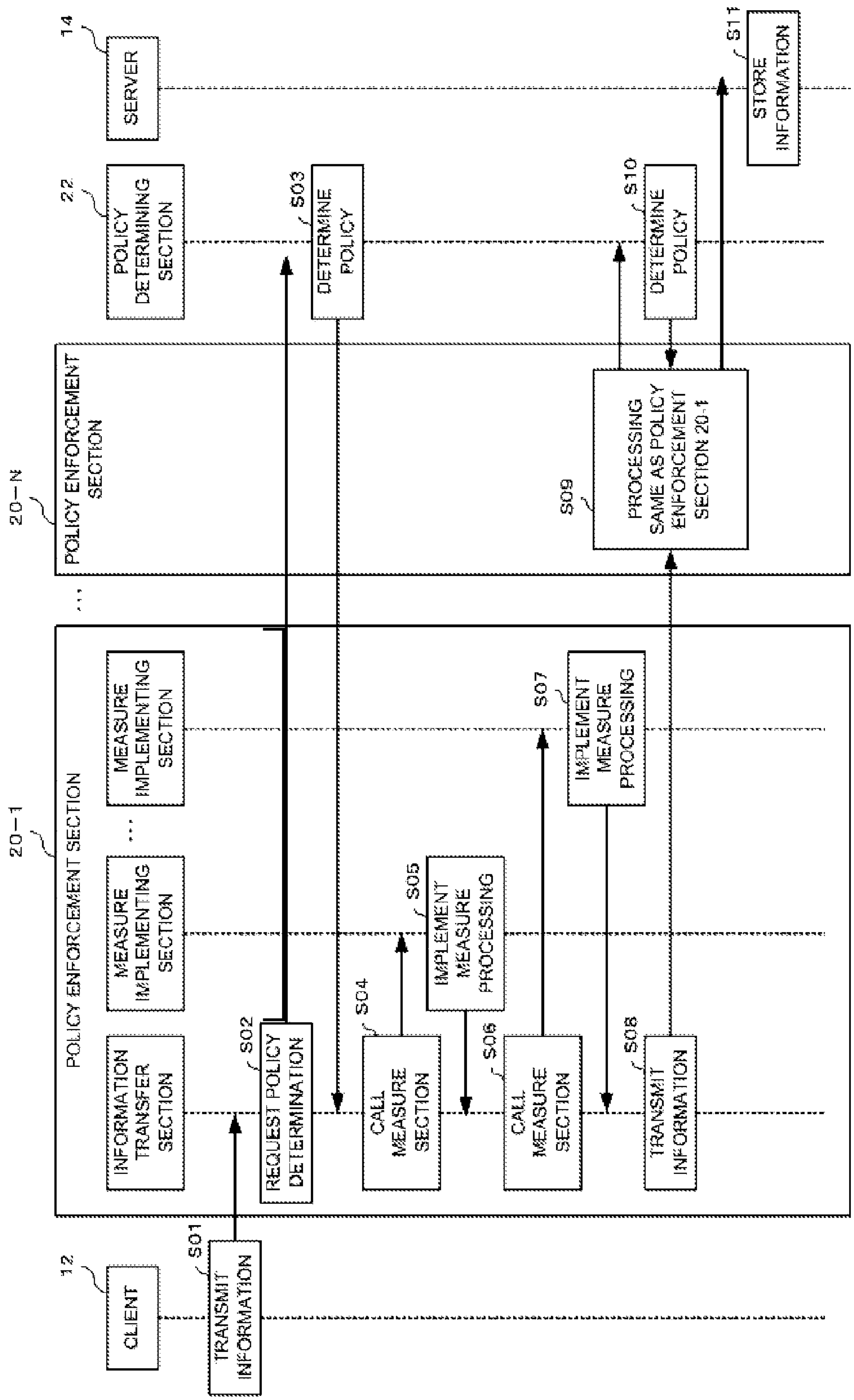
FIG. 12 is a sequence chart showing an example of the operation of the security policy enforcement system.

The operation of the security policy enforcement system 10 is explained. As explained above, the security policy enforcement system 10 includes the plurality of policy enforcement sections 20. Information transmitted from the client 12 finally reaches the server 14 through the plurality of policy enforcement sections 20. Security measures are implemented on the information when the information passes the respective policy enforcement sections 20. An example of the operation of the security policy enforcement system 10 is explained in detail with reference to a sequence chart of FIG. 12.

First, the client 12 used by the user transmits information to the information transfer section 50 of the policy enforcement section 20-1 (S01). The information to be transmitted includes a user ID and an identifier of a service that the user desires to use (a service ID) besides information that the user desires to transmit to the server 14 (location information, a blog description, etc.).

Upon receiving the information, the information transfer section 50 inquires the policy determining section 22 about measures to be implemented and a destination to which the information is to be transferred next (S02). As shown in FIG. 10, the inquiry includes a policy enforcement section ID, a user ID, and a service ID. Information concerning implemented measures is also added to the inquiry. Since measures are not implemented yet, "none" is shown in the implemented measures.

The policy determining section 22 retrieves a policy from the policy DB on the basis of the user ID and the service ID and determines necessary measures (S03). The policy determining section 22 specifies, using the measure arrangement DB, the policy enforcement section 20 in which the necessary measure implementing section 52 is arranged. Finally, the policy determining section 22 notifies, using, for example, the format shown in FIG. 11, the policy enforcement section 20-1 of the measures to be implemented, a parameter of the measures, and an ID of the policy enforcement section 20 at the transfer destination of the information or a service ID. Detailed operation of the policy determination is explained below.

Upon receiving the measures to be implemented and the transfer destination of the information from the policy determining section 22, concerning the instructed measures, the information transfer section 50 calls the measure implementing sections 52 in order and causes the measure implementing sections 52 to execute measure processing for the information (S04 to S07).

For example, when the policy determining section 22 instructs to call the measure implementing sections 52-1 and 52-M, first, the information transfer section 50 calls the measure implementing section 52-1 and passes the information and a parameter for implementing measures to the measure implementing section 52-1 (S04). As explained above, when the information transfer section 50 calls the measure implementing section 52, the format shown in FIG. 5 can be used.

The measure implementing section 52-1 receives the information and executes a measure algorithm determined in advance using the parameter of the measures to thereby execute security measure processing on the information and returns processed information to the information transfer section 50 (S05). As shown in FIG. 6, the measure implementing section 52 notifies the information transfer section 50 at the call source of information indicating whether the processing of the measures is successful in addition to the processed information.

If the measure implementing section 52-1 fails in the processing of the security measures because of some reason (if the item of the measure result in FIG. 6 is "failure") in step S05, the policy enforcement section 20 notifies the client 12 of an error and ends the processing. If the processing of the measures is successful in step S05, as in step S04, the information transfer section 50 calls the measure implementing section 52-M (S06). The measure implementing section 52-M applies the measures to the information and returns the information to the information transfer section 50 (S07).

The information transfer section 50 transfers the information to the policy enforcement section 20 (more accurately, the information transfer section 50 of the policy enforcement section 20) designated by the policy determining section 22 (S08). If the server 14 is designated rather than the policy enforcement section 20, the information transfer section 50 transmits the information to the server 14.

Like the preceding policy enforcement section 20-1, the next policy enforcement section 20-N that receives the information inquires the policy determining section 22 about necessary measures and a transfer destination, calls the measure implementing section 52 to implement measures, and finally transfers the information (S09 and S10). In an example shown in FIG. 12, the policy enforcement section 20-N receives an instruction to transfer the information from the policy determining section 22 to the server 14 and transfers the information to the server 14.

Finally, the server 14 receives the information from the policy enforcement section 20-N and stores the information on the inside of the server 14 (S11).

Figure 13:
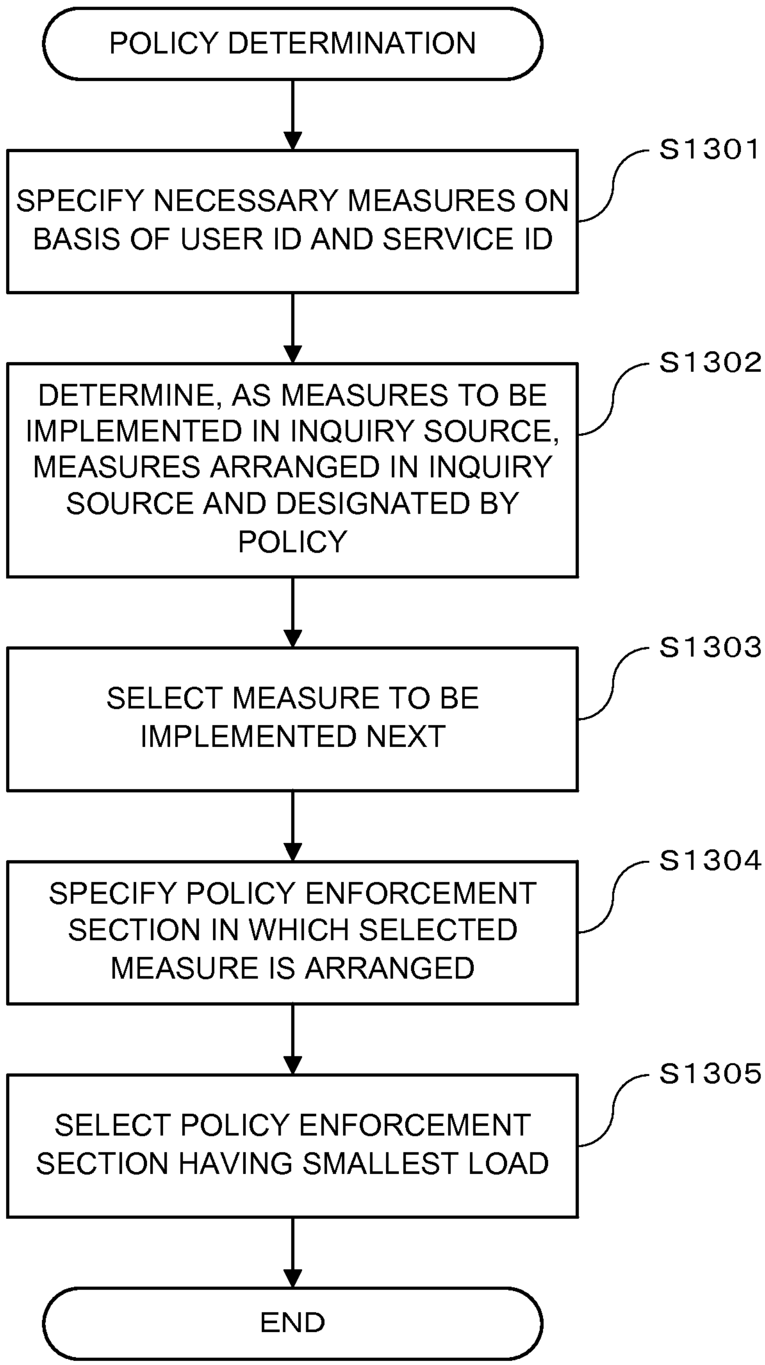
FIG. 13 is a flowchart for explaining an example of a policy determining operation.

Details of the operation of the policy determination in the policy determining section 22 are explained. FIG. 13 is a flowchart showing an example of the policy determining operation. First, the policy determining section 22 searches through the policy DB on the basis of a user ID and a service ID and acquires a list of necessary measures (S1301).

Subsequently, the policy determining section 22 searches through the measure arrangement DB using a policy enforcement section ID indicating an inquiry source and specifies what kinds of the measure implementing sections 52 are arranged in the policy enforcement section 20 at the inquiry source. The policy determining section 22 determines, as measures to be implemented by the policy enforcement section 20 at the inquiry source, measures included in the necessary measures list of the policy and arranged in the policy enforcement section 20 at the inquiry source (S1302). At this point, the policy determining section 22 excludes already implemented measures from the measures to be implemented referring to the item of the implemented measures of the format of inquiry (FIG. 4).

Subsequently, the policy determining section 22 determines a transfer destination of the information (the next policy enforcement section 20 or the server 14) (S1303 to S1305). The respective steps are explained in detail.

In the measures list of the policy, the policy determining section 22 selects one measure to be implemented next out of measures that are not implemented on the information and should not be implemented by the policy enforcement section 20 at the inquiry source (S1303). A method of selecting a measure may be order written in the policy or may be at random. When a measure cannot be selected, i.e., implementation of all the measures designated in the policy is completed because measures are implemented by the policy enforcement section 20 at the inquiry source, the policy determining section 22 sets the server 14 as a transfer destination of the information and ends the processing.

The policy determining section 22 retrieves, from the measure arrangement DB, the policy enforcement sections 20 in which the measure selected in step S1303 is arranged (step S1304).

When the measure selected in step S1303 is arranged in only one policy enforcement section 52, the policy determining section 22 determines the policy enforcement section 52 as a transfer destination. When the measure selected in step S1303 is arranged in a plurality of policy enforcement sections 52, the policy determining section 22 determines, referring to the load state DB, the policy enforcement section 52 having the smallest load as the policy enforcement section 52 to which the information is to be transferred next (S1305).

As explained above, the security policy enforcement system 10 according to this embodiment is configured to distribute and enforce the security policy. Therefore, it is possible to apply the security policy enforcement system 10 to a large system.

In the above explanation, one server 14 is provided. However, a plurality of servers 14 may be provided. In this case, in the measure arrangement DB, not only an arrangement state of the measure implementing sections 52 but also information indicating which service is arranged in which server 14 is managed. In the load state DB, similarly, information indicating a load of the server is managed. In selecting the server 14, the policy determining section 22 selects the server 14 having the smallest load among the servers 14 in which services are arranged and notifies the information transfer section 50 of the server 14 as a transfer destination of the information. Consequently, it is possible to perform not only load distribution of security policy enforcement but also load distribution of the servers.

In the above explanation, the measures included in the necessary measures list of the policy and arranged in the policy enforcement section 20 at the inquiry source are determined as measures to be implemented by the policy enforcement section 20 at the request source. That is, the policy determining section 22 instructs implementation of a plurality of measures at a time. However, the policy determining section 22 may instruct implementation of one measure without instructing the implementation of the plurality of measures. When processing of other measures is continuously performed by the same policy enforcement section 20, the policy determining section 22 only has to designate the same policy enforcement section 20 as a transfer destination. When the transfer destination of the policy enforcement section 20 is the policy enforcement section 20 itself, the policy enforcement section 20 only has to perform only measures and not to perform transfer of the information. The implementation of one measure is an example. Two or three measures may be instructed.

For example, since it takes time to implement the plurality of measures, it is likely that a state of a load of the policy enforcement section 20 changes during the time and computer resources cannot be efficiently used. Since an implementation time of one measure is shorter than the implementation of the plurality of measures, time until the next inquiry to the policy determining section 22 decreases. Therefore, there is an effect that it is possible to more flexibly cope with fluctuation in the load of the policy enforcement section 20. This operation has a disadvantage that the number of times of a policy determination request from the policy enforcement section 20 to the policy determining section 22 and the number of times of data transfer between the policy enforcement sections 20 increase. However, the disadvantage can be neglected in a high-speed network environment.

In the explanation, the policy enforcement section 20 inquires about measures to be implemented by the policy enforcement section 20 and a transfer destination at a time. However, the policy enforcement section 20 may inquire about the measures and the transfer destination separately. Specifically, upon receiving information, the policy enforcement section 20 inquires the policy determining section 22 about measures to be implemented and implements the measures. After implementing the measures, the policy enforcement section 20 inquires the policy determining section 22 about a transfer destination of the information and transfers the information according to an instruction of the policy determining section 22. In this operation, since the policy enforcement section 20 inquires about the transfer destination immediately before transferring the information, there is an effect that it is possible to determine the transfer destination according to a latest load state.

Second Embodiment

A second embodiment in which implementation order of security measures is taken into account is explained. The security measures are sometimes limited in order of implementation of the measures. For example, when encryption and anti-virus are considered, since the anti-virus checks whether a pattern of a virus is included in information, the anti-virus cannot be applied to encrypted information. Therefore, the anti-virus has to be implemented earlier than the encryption. Therefore, in the operation of the policy determining section 22 shown in FIG. 13, since order for implementing the measures cannot be designated, it is likely that the measures cannot be implemented depending on order.

Therefore, the policy determining section 22 may include, on the inside, an order constraint DB (an order-constraint storing section) in which order constraint information indicating a constraint on execution order of measures is recorded. Specifically, priority only has to be specified for all the measures arranged in the policy enforcement section 20. The policy determining section 22 only has to select measures according to the priority in steps S1302 and S1303 in the processing shown in FIG. 13.

For example, it is assumed that measures, i.e., log recording, anti-virus, and encryption are arranged in the policy enforcement section 20. The following two requirements (1) and (2) are assumed. (1) Information before deletion of a virus by the anti-virus is desired to be recorded in a log. (2) If information is encrypted, processing of the anti-virus cannot be performed. In this case, the policy determining section 22 only has to hold priority "the log recording→the anti-virus→the encryption" on the inside.

Figure 14:
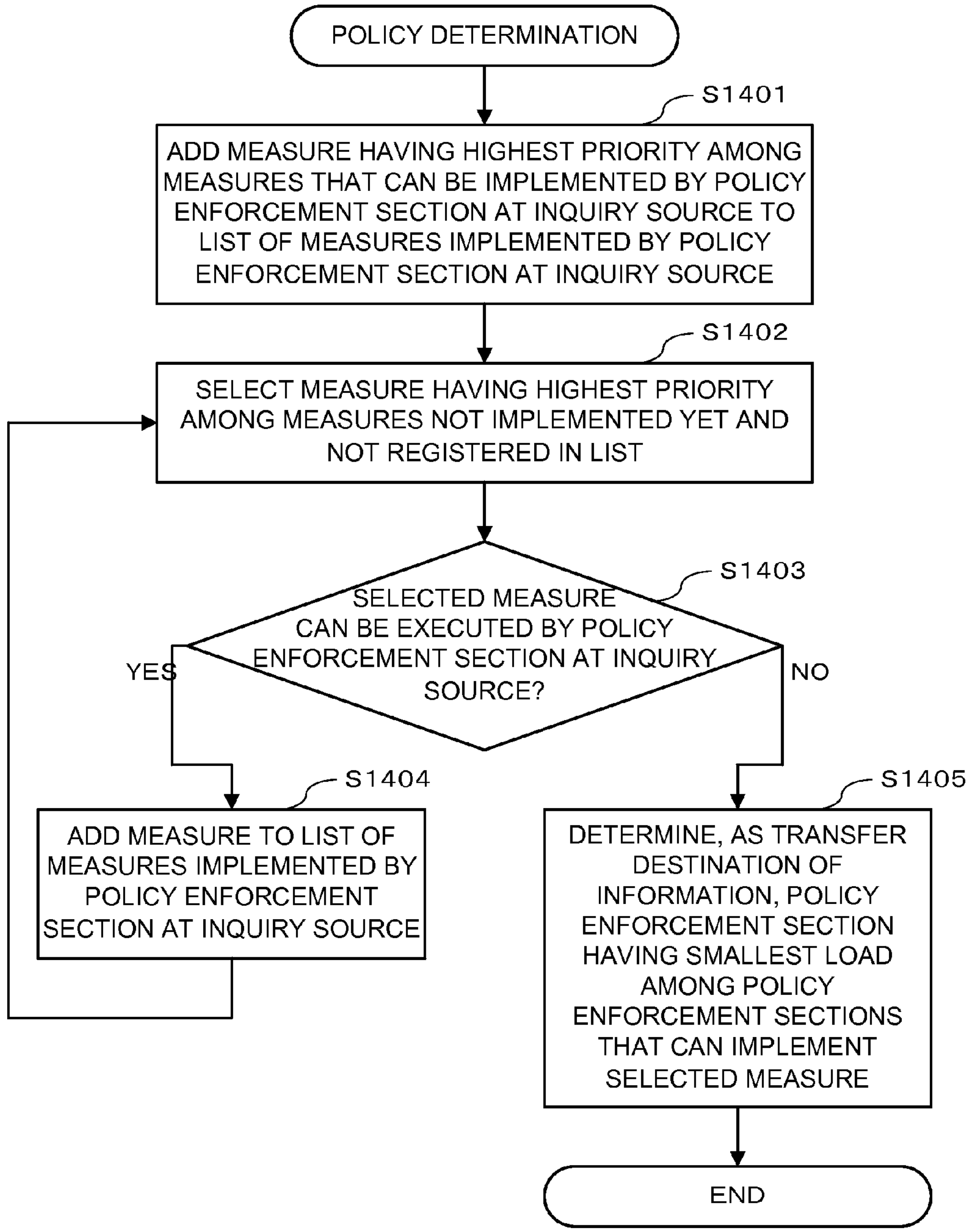
FIG. 14 is a flowchart for explaining another example of the policy determining operation.

The processing in steps S1302 to S1305 in FIG. 13 is changed to, for example, processing shown in FIG. 14 such that the policy enforcement section 20 that transfers the information is determined on the basis of the priority.

The policy determining section 22 adds a measure having the highest priority among the measures that can be implemented by the policy enforcement section 20 at the inquiry source to a list of measures to be implemented by the policy enforcement section 20 at the inquiry source (S1401).

Subsequently, the policy determining section 22 selects a measure having the highest priority among measures not implemented for information yet and not included in the list (S1402).

The policy determining section 22 determines, referring to the measure arrangement DB, whether the selected measures can be implemented by the policy enforcement section 20 at the inquiry source (S1403).

When the selected measure can be implemented by the policy enforcement section 20 at the inquiry source (YES in S1403), the policy determining section 22 adds the selected measure to the list of measures to be implemented by the policy enforcement section 20 at the inquiry source (S1404) and returns to step S1402.

When the selected measure cannot be implemented by the policy enforcement section 20 at the inquiry source (NO in S1403), the policy determining section 22 completes creation of the list of measures to be implemented by the policy enforcement section 20 at the inquiry source. The policy determining section 22 determines, as a transfer destination of the information, the policy enforcement section 20 having the smallest load among the policy enforcement sections 20 that can implement the selected measure (S1405).

Since the priority is provided for the measures in this way, it is possible to surely implement the measures having a dependency relation.

Third Embodiment

A third embodiment in which implementation order of security measures is taken into account is explained. In the second embodiment, the priority of all the measures is stored. However, when the number of measures increases, it is sometimes difficult to designate priority.

Therefore, the policy determining section 22 may include an order constraint DB in which order constraint information indicating a partial order constraint is recorded shown in FIG. 15. In the order constraint DB, information indicating a constraint on order of measures such as "a measure A has to be executed earlier than a measure B (in the figure, shown as A→B)" is recorded. In an example shown in FIG. 15, it is indicated that log recording has to be implemented earlier than processing of conversion into provisional ID and anti-virus has to be implemented earlier than encryption.

In this embodiment, the policy determining section 22 rearranges the order of measures to satisfy the order constraint and selects a measure to be implemented next. Specifically, the policy determining section 22 regards the order constraint on the measures as a directed graph, merges directed graphs representing respective order constraint, and creates a directed graph indicating a dependency relation among the measures. The policy determining section 22 selects the measures in order from a highest-order measure indicated by the directed graph indicating the dependency relation.

Figure 16A:
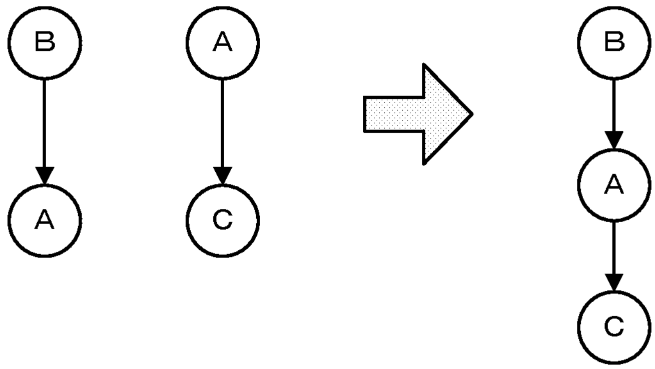
FIG. 16 is a diagram showing examples of merging of directed graphs indicating dependency relations.
Figure 16B:
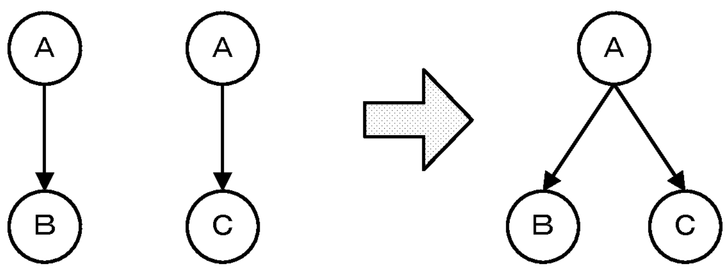
Figure 16C:
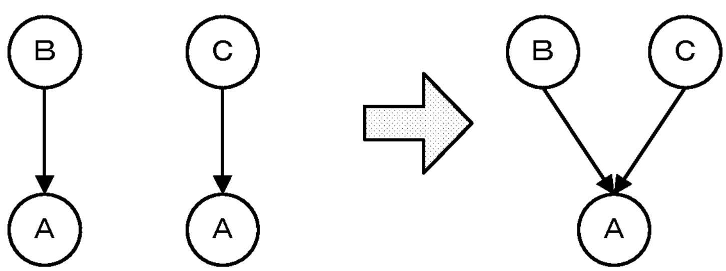

The merging of the graphs can be performed by combining common measures into one. For example, when there are a graph of the measure B→a measure C and a graph of a measure A→the measure C, the graphs can be merged as shown in FIG. 16A. When there are a graph of the measure A→the measure B and a graph of the measure A→the measure C, the graphs can be merged as shown in FIG. 16B. Further, when there are a graph of the measure B→the measure A and a graph of the measure C→the measure A, the graphs can be merged as shown in FIG. 16C.

The policy determining section 22 selects measures in order from a highest-order measure of the merged directed graph and rearranges the necessary measures list of the policy. The order of the selection only has to be determined using, for example, topological sort. Since the topological sort is a general technique, detailed explanation of the topological sort is omitted.

When the graphs cannot be merged into one, for example, when the graphs are merged into two graphs of the measure A→the measure B→the measure C and a measure D→a measure E→a measure F, the same measure does not appear in the respective graphs and there is no dependency relation of the measures, the order of the measures only has to be determined for each of the graphs.

The measures are implemented as explained above according to the order of the measures determined in this way.

When there is a closed circuit in the directed graph, for example, "A→B→C→A", the dependency relation loops. The constraint cannot be satisfied irrespective of in which order the measures are implemented. Therefore, in this case, the policy determining section 22 notifies the administrator or the client 12 of an error.

In such a configuration, a platform administrator does not have to describe a dependency relation among all the measures. Therefore, it is possible to simplify management.

When there are two or more graphs of the dependency relation among the measures, the policy determining section 22 can be configured to extract the policy enforcement sections 20 in which any one of measures that can be implemented next in the graphs is arranged. The policy determining section 22 may instruct to transfer the information to the policy enforcement section 20 having the smallest load among the policy enforcement sections 20.

For example, when there are two graphs of the measure A→the measure B→the measure C and the measure D→the measure E→the measure F and the measure A and the measure D are already implemented or implemented by the policy enforcement section by the policy enforcement section 20 at the inquiry source, the measure B and the measure E can be implemented by the next policy enforcement section 20. In this case, for example, it is assumed that there are two policy enforcement section 20 in which the measure B is arranged and loads of the policy enforcement sections 20 are respectively 50% and 60% and there are two policy enforcement sections 20 in which the measure E is arranged and loads of the policy enforcement sections 20 are respectively 10% and 90%. In this case, the policy determining section 22 instructs transfer to the policy enforcement section 20 with the smallest load (10%).

When a plurality of measures can be implemented even if there is one graph of a dependency relation, for example, there are the measure B and the measure C of the graph shown in FIG. 16C, the policy enforcement section 20 having the smallest load among the policy enforcement sections 20 that can implement any one of the measures may be selected as a transfer destination of the information.

Even if there is no order constraint as in the first embodiment, a transfer destination of the information may be selected in the same procedure.

According to such operation, the information is transferred to the policy enforcement section 20 having the smallest load. Therefore, it is possible to efficiently use computer resources.

Fourth Embodiment

A fourth embodiment in which the number of times of inquiry to the policy determining section 22 is taken into account is explained. In the embodiments explained above, the respective policy enforcement sections 20 sends inquiries to the policy determining section 22. Therefore, when the number of times of transmission of information increases according to an increase in the number of users or when a large number of policy enforcement sections 20 are used, the number of times of inquiry to the policy determining section 22 increases, which is likely to be a bottleneck.

Therefore, in order to prevent an increase in inquiries to the policy determining section 22, the policy determining section 22 may collectively perform not only notification to the first policy enforcement section 20 but also notification to the policy enforcement sections 20 following the first policy enforcement section 20 in response to an inquiry of the first policy enforcement section 20. Consequently, it is possible to reduce the number of times of inquiry.

An operation is specifically explained. The policy determining section 22 repeats steps S1303 to S1305 in FIG. 13 and determines in which policy enforcement sections 20 all the measures are implemented. The policy determining section 22 collectively notifies the first policy enforcement section 20 of the order of the policy enforcement sections 20 and the measures implemented by the respective policy enforcement sections 20.

FIG. 17 shows an example of a format in collectively notifying the order and the measures. The example shown in FIG. 17 indicates that information is anonymized in the policy enforcement section 20-2 having ID "2", and anti-virus processing is performed in the policy enforcement section 20-3 having ID "3".

The respective policy enforcement sections 20 transfer the collected notification to the next policy enforcement sections 20 together with the information. Rather than inquiring the policy determining section 22 about the measures, the policy enforcement section 20 calls designated measures on the basis of a notification received from the preceding policy enforcement section 20 and transfers the information to the next policy enforcement section 20 or the server 14.

For example, when the policy enforcement section 20-1 receives the information from the client 12 first and the notification shown in FIG. 17 is sent from the policy determining section 22, the policy enforcement section 20-1 refers to the item of measures referring to the field of the ID of the policy enforcement section 20-1. In the case of this example, since "none" is shown in the measures, the policy enforcement section 20-1 transfers the information to the next policy enforcement section 20, i.e., the policy enforcement section 20-2 having the ID No. 2.

The policy enforcement section 20-2 refers to the item of measures referring to the field of the ID of the policy enforcement section 20-2 and implements the measures. In the case of this example, encryption is implemented. Next, the policy enforcement section 20-2 transfers the information to the next policy enforcement section 20, in this example, the policy enforcement section 20-3 having the ID No. 3.

The policy enforcement section 20-3 performs processing of anti-virus referring to the item of measures of the ID of the policy enforcement section 20-3. Since a notification content shown in FIG. 17 is the last notification content, the policy enforcement section 20-3 transfers the information to the server 14.

Since the notification is collectively performed in this way, it is possible to reduce the number of times of inquiry to the policy determining section 22.

Rather than collectively notifying the first policy enforcement section 20 of the measures to be implemented by the policy enforcement sections 20, the policy enforcement sections 20 may cache the notification of the policy determining section 22 for a fixed period to thereby reduce the number of times of inquiry.

In the above explanation, the parameter for measures is passed to the measure implementing sections 52 from the policy determining section 22 via the information transfer section 50 every time an inquiry is received from the policy enforcement section 20. No problem occurs when the size of the parameter is small. However, when the size of the parameter is large, the parameter consumes a network band. Therefore, it is likely that deterioration in performance occurs. Therefore, the parameter of measures is notified to the measure implementing sections 52 in advance. When the policy determining section 22 responds to an inquiry from the policy enforcement sections 20, the notification of the parameter of measures may be omitted.

Fifth Embodiment

A fifth embodiment in which a dynamic arrangement of the measure implementing sections 52 is taken into account is explained. In the embodiments explained above, the measure implementing sections 52 are arranged in the policy enforcement section 20 in advance. However, arrangement and deletion of the measure implementing sections 52 may be performed according to a load state. In that case, the measure arrangement DB only has to be updated.

For example, when the measure implementing section 52 that executes a measure a is arranged in the policy enforcement section 20-4 having a small load, a row (4, measure a) is added to the measure arrangement DB shown in FIG. 8. When "the measures a" is implemented according to a policy, information is transferred to the policy enforcement section 20-4 having ID "4", and "the measure a" is implemented.

The measure implementing section 52 is arranged in the policy enforcement section 20 having the low load in this way, it is possible to distribute the load. In the example explained above, the measure implementing section 52 is arranged anew in order to distribute the load. However, the measure implementing section 52 may be arranged in order to increase measures that can be implemented by the policy enforcement section 20.

In performing the arrangement of the measure implementing section 52, an arrangement destination may be determined taking into account a state of a network. Specifically, the policy determining section 22 includes a transfer time database (transfer time DB) indicating time for transferring information among the policy enforcement sections 20. The policy determining section 22 determines in which policy enforcement section 20 a certain measure A is to be arranged, to minimize a transfer time.

For example, it is assumed that a user transmits information to the policy enforcement section 20-1. For example, it is assumed that an information transfer time from the policy enforcement section 20-1 to the policy enforcement section 20-2 is one second, an information transfer time from the policy enforcement section 20-2 to the server 14 is one second, an information transfer time from the policy enforcement section 20-1 to the policy enforcement section 20-3 is two seconds, an information transfer time from the policy enforcement section 20-3 to the server 14 is two seconds.

When the measure implementing section 52 that implements the measure A is arranged in the policy enforcement section 20-2, transfer of the information takes one second+one second, i.e., two seconds in total. When the measure implementing section 52 is arranged in the policy enforcement section 20-3, transfer of the information takes two seconds+two seconds, i.e., four seconds in total. Therefore, the policy determining section 22 determines that the measure implementing section 52 only has to be arranged in the policy enforcement section 20-2.

In the above explanation, the transfer times of the information among the policy enforcement sections 20 are used as the information indicating a state of the network. However, the information indicating a state of the network is not limited to this. For example, information such as the speed of the network or a rate of use of a band may be used as the information indicating a state of the network.

An arrangement destination of the measure implementing section 52 may be determined taking into account both of the state of the network and the loads of the policy enforcement sections 20. Specifically, time in which the measure implementing section 52 about to be arranged processes information in the policy enforcement sections 20 only has to be added to the transfer times of the information. The measure implementing section 52 only has to be arranged in the policy enforcement section 20 in which a total time is the shortest.

For example, arrangement of a measure that takes one second when a load is 0% is considered. In the above example, when it is assumed that the policy enforcement section 20-2 has a load of 80% and the policy enforcement section 20-3 has a load of 50%, the policy enforcement section 20-2 and the policy enforcement section 20-3 respectively require five seconds and two seconds as processing times for the measure. Therefore, if added up with the transfer times of the paths, when the measure implementing section 52 is arranged in the policy enforcement section 20-2, the processing time is one second+one second+five seconds, i.e., seven seconds in total and, when the measure implementing section 52 is arranged in the policy enforcement section 20-3, the processing time is two seconds+two seconds+two seconds, i.e., six seconds in total. Therefore, the policy determining section 22 determines that the measure implementing section 52 only has to be arranged in the policy enforcement section 20-3.

When there are a plurality of users or when there are a plurality of servers, times only have to be calculated concerning all combinations of the users and the servers. The measure implementing section 52 only has to be arranged in the policy enforcement section 20 in which the total time is the shortest.

Conversely to the above, when it is desired to delete the measure implementing section 52, the measure implementing section 52 arranged in a path in which the total time is long only has to be deleted.

Sixth Embodiment

A sixth embodiment in which a virtual machine is taken into account is explained. Concerning components same as those in the first embodiment, explanation is omitted.

Figure 18:
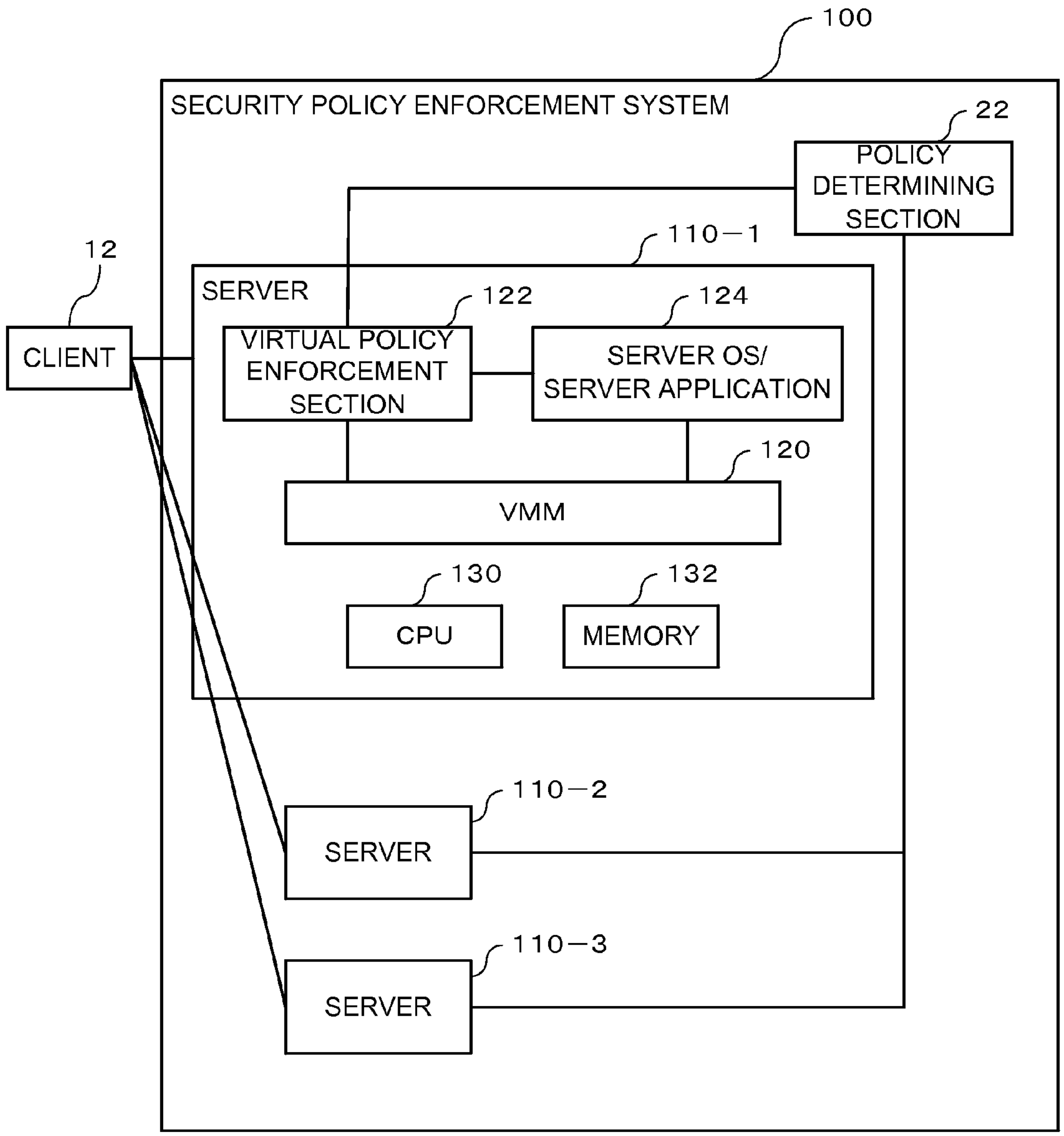
FIG. 18 is a diagram showing another configuration example of the security policy enforcement system.

FIG. 18 is a diagram showing the configuration of a security policy enforcement system according to this embodiment. As shown in FIG. 18, the security policy enforcement system is different from the first embodiment in that, whereas the server 14 in the first embodiment includes only the server OS/server application 40 that provides a service, a server 110 in this embodiment includes a virtual machine monitor (VMM) 120, a virtual policy enforcement section 122, and a server OS/server application 124.

The VMM 120 is a program that can virtualize hardware such as a CPU 130 and a memory 132 and then cause a plurality of OSes to operate. Since the VMM 120 is a general technique, detailed explanation of the VMM 120 is omitted. As the VMM 120, for example, VMWare (registered trademark) and Xen (registered trademark) can be used.

The virtual policy enforcement section 122 performs implementation of security measures like the policy enforcement section 20 in the first embodiment. The policy enforcement section 20 in the first embodiment includes the physically independent computer. However, the virtual policy enforcement section 122 in this embodiment is different in that the virtual policy enforcement section 122 operates on a computer virtualized by the VMM 120.

The server OS/server application 124 provides a service like the server 14 in the first embodiment. The server OS/server application 124 is different from the first embodiment in that the server OS/server application 124 operates on the computer virtualized by the VMM 120.

The entire operation in this embodiment is explained. The entire operation is basically the same as the operation in the first embodiment. The client 12 transmits information to the virtual policy enforcement section 122 provided by a server 110-1. As in the first embodiment, the virtual policy enforcement section 122 inquires the policy determining section 22 about measures to be implemented and a transfer destination. After implementing the measures, the virtual policy enforcement section 122 transmits the information to the server OS/server application 124. Finally, the server OS/server application 124 stores the information on the inside.

In this embodiment, the virtual policy enforcement section 122 and the server OS/server application 124 share the same CPU and the same memory. Therefore, when the server OS/server application 124 does not use the CPU and the memory for a long time, the virtual policy enforcement section 122 uses an idle time. Therefore, it is possible to improve efficiency of use of the CPU and the memory.

Seventh Embodiment

Figure 19:
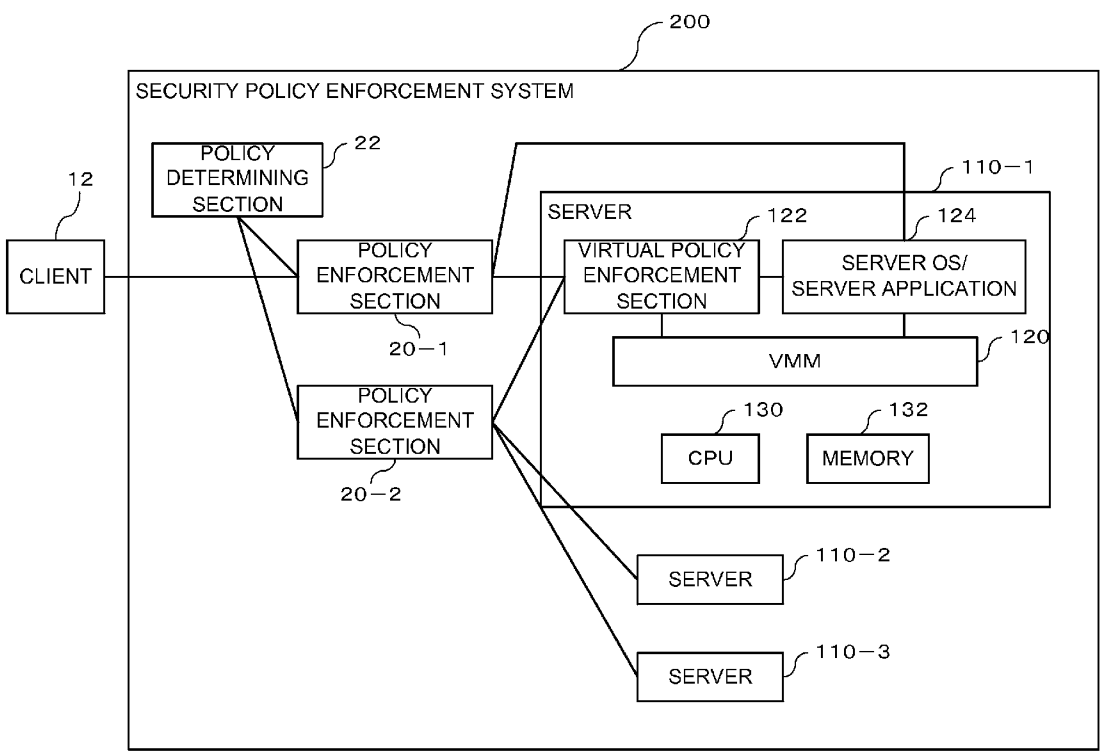
FIG. 19 is a diagram showing still another configuration example of the security policy enforcement system.

A seventh embodiment in which a hybrid configuration including a virtual machine is taken into account is explained. FIG. 19 is a diagram showing the configuration of a security policy enforcement system according to this embodiment. As shown in FIG. 19, as a characteristic of this embodiment, the security policy enforcement system includes both of the policy enforcement section 20 explained in the first embodiment and the virtual policy enforcement section 122 explained in the sixth embodiment.

The policy enforcement section 20 basically performs an operation same as the operation in the first embodiment. However, this embodiment is different from the first embodiment in that, whereas the information is transmitted to the policy enforcement section 20 or the server 14 in the first embodiment, in this embodiment, information is transmitted to the virtual policy enforcement section 122 or the server OS/server application 124 in this embodiment.

The operations of the policy enforcement section 20 and the virtual policy enforcement section 122 are the same as those in the first and sixth embodiments. Therefore, explanation of the operations is omitted.

In this embodiment, the measure implementing sections 52 are arranged according to the loads of the policy enforcement sections 20 and the servers 110 and the measure implementing sections 52 of the policy enforcement section 20 and the server 110 having small loads are used, whereby it is possible to more efficiently use computer resources.

The embodiments are intended to facilitate understanding of the present invention and not to limitedly interpret the present invention. The present invention can be changed or improved without departing from the spirit of the present invention. The present invention includes equivalents of the present invention.

For example, in the embodiments explained above, each of the policy enforcement sections 20 includes the plurality of measure implementing sections 52. However, each of the policy enforcement sections 20 may include only one measure implementing section 52. In this case, the policy determining section 22 only has to transmit a transfer destination of information to the policy enforcement section 52. This is because, since the policy enforcement section 20 includes only one measure implementing section 52, it is evident that the policy enforcement section 20 calls the measure implementing section 52 and information indicating measures to be implemented can be omitted.

With such a configuration, it is possible to reduce a message size for a response from the policy determining section 22 to the policy enforcement section 20. Since the policy enforcement section 20 includes only one measure implementing section 52, measures by the measure implementing section 52 may be executed while policy enforcement section 20 waits for a response concerning a transfer destination from the policy determining section 22. That is, since steps S02 and S04 in FIG. 12 can be executed in parallel, higher-speed operation is possible.

For example, in the embodiments explained above, the information transfer section 50 and the measure implementing sections 52 operate on the same computer. However, the information transfer section 50 and the measure implementing sections 52 may operate on different computers. In that case, the information transfer section 50 only has to call the measure implementing sections 52 through a network.

This application claims priority based on Japanese Patent Application No. 2011-013392 filed on Jan. 25, 2011, the entire disclosure of which is incorporated herein.

The present invention is explained above with reference to the embodiments. However, the present invention is not limited to the embodiments. Various modifications understandable by those skilled in the art can be made to the configuration and the details of the present invention within the scope of the present invention.

A part or all of the embodiments can be described as indicated by notes below. However, the present invention is not limited to the below description.

(Note 1) A security policy enforcement system comprising: a plurality of policy enforcement sections configured to execute a security measure on user information transmitted from a client to a server; a policy storing section configured to store policy information indicating the security measure to be executed on the user information; a measure-arrangement storing section configured to store measure arrangement information indicating the security measure executable in each of the policy enforcement sections; and a policy determining section configured to select, on the basis of the policy information and the measure arrangement information, one or more of the policy enforcement sections that execute the security measure on the user information among the plurality of policy enforcement sections, wherein each of the one or more policy enforcement sections executes the security measure on the user information and outputs, on the basis of a selection result of the policy determining section, the user information to the other policy enforcement sections among the one or more policy enforcement sections or to the server.

(Note 2) The security policy enforcement system according to note 1, further comprising a load-state storing section configured to store load information indicating load states of the policy enforcement sections, wherein the policy determining section selects, on the basis of the load information, the policy enforcement section having a smallest load state among the policy enforcement sections that can execute the security measure corresponding to the policy information.

(Note 3) The security policy enforcement system according to note 1 or 2, further comprising an order-constraint storing section configured to store order constraint information indicating a constraint on execution order of a plurality of the security measures, wherein the policy determining section selects, on the basis of the order constraint information, the one or more policy enforcement sections such that the security measure is executed according to the constraint.

(Note 4) The security policy enforcement system according to any one of notes 1 to 3, wherein the server includes a virtual machine monitor configured to virtualize hardware, and one or more of the plurality of policy enforcement sections are realized using the hardware virtualized by the virtual machine monitor.

(Note 5) The security policy enforcement system according to any one of notes 1 to 4, wherein the policy enforcement section that has received the user information from the client among the plurality of policy enforcement sections transmits a selection request for the one or more policy enforcement sections to the policy determining section, the policy determining section transmits, in response to the selection request, selection results of all of the one or more policy enforcement sections to the policy enforcement section that has received the user information, and the policy enforcement sections other than the policy enforcement section that has received the user information among the one or more policy enforcement sections do not transmit the selection request for the policy enforcement sections to the policy determining section and output, on the basis of the selection results, the user information to the other policy enforcement sections among the one or more policy enforcement sections or to the server.

(Note 6) The security policy enforcement system according to any one of notes 1 to 5, further comprising a network-state storing section configured to store network information indicating a state of a network among the plurality of policy enforcement sections, wherein the policy determining section selects, on the basis of the network state, the policy enforcement section efficient for transfer of the user information among the policy enforcement sections that can execute the security measure corresponding to the policy information.

(Note 7) A security policy enforcement method comprising: storing, in a policy storing section, policy information indicating a security measure to be executed on user information transmitted from a client to a server; storing, in a measure-arrangement storing section, measure arrangement information indicating the security measure executable in each of a plurality of policy enforcement sections; selecting, on the basis of the policy information and the measure arrangement information, one or more of the policy enforcement sections that execute the security measure on the user information among the plurality of policy enforcement sections; and each of the one or more policy enforcement sections executing the security measure on the user information and outputting, on the basis of a selection result, the user information to the other policy enforcement sections among the one or more policy enforcement sections or to the server.

(Note 8) A program for causing a computer to realize a function of selecting, on the basis of policy information indicating a security measure to be executed on user information transmitted from a client to a server and measure arrangement information indicating the security measure executable in each of a plurality of policy enforcement sections, one or more of the policy enforcement sections that execute the security measure on the user information among the plurality of policy enforcement sections.

10 security policy enforcement system
12 client
14 server
20 policy enforcement section
22 policy determining section

I claim:

1. A security policy enforcement system comprising:
at least one central processing unit (CPU) configured to execute a plurality of sections, comprising:
a plurality of policy enforcement sections, each policy enforcement section being configured to execute a security measure on user information, the user information being transmitted from a client to a server along with a service identifier identifying one of a plurality of services;
a policy storing section configured to store policy information indicating the security measure to be executed on the user information, each piece of the policy information including the service identifier and information on the security measure to be executed on the user information;

a measure-arrangement storing section configured to store measure arrangement information indicating the security measure executable in each of the policy enforcement sections;

a policy determining section configured to select, on the basis of, the service identifier transmitted from the client to the server along with the user information, the policy information and the measure arrangement information, one or more of the policy enforcement sections that execute the security measure on the user information among the plurality of policy enforcement sections; and a load-state storing section configured to store load information indicating load states of the policy enforcement sections, wherein each of the one or more policy enforcement sections executes the security measure on the user information and outputs, on the basis of a selection result of the policy determining section, the user information, on which the security measure has been executed, to the other policy enforcement sections among the one or more policy enforcement sections or to the server, along with the service identifier; and the policy determining section selects as a transfer destination of the user information, on the basis of the load information, a policy enforcement section having a smallest load state among the policy enforcement sections that can execute the security measure corresponding to the policy information.

2. The security policy enforcement system according to claim 1, further comprising an order-constraint storing section configured to store order constraint information indicating a constraint on execution order of a plurality of the security measures, wherein the policy determining section selects, on the basis of the order constraint information, the one or more policy enforcement sections such that the security measure is executed according to the constraint.

3. The security policy enforcement system according to claim 1, wherein the server includes a virtual machine monitor configured to virtualize hardware, and one or more of the plurality of policy enforcement sections are realized using the hardware virtualized by the virtual machine monitor.

4. The security policy enforcement system according to claim 1, wherein the policy enforcement section that has received the user information from the client among the plurality of policy enforcement sections transmits a selection request for the one or more policy enforcement sections to the policy determining section, the policy determining section transmits, in response to the selection request, selection results of all of the one or more policy enforcement sections to the policy enforcement section that has received the user information, and the policy enforcement sections other than the policy enforcement section that has received the user information among the one or more policy enforcement sections do not transmit the selection request for the policy enforcement sections to the policy determining section and output, on the basis of the selection results, the user information to the other policy enforcement sections among the one or more policy enforcement sections or to the server.

5. The security policy enforcement system according to claim 1, further comprising a network-state storing section configured to store network information indicating a state of a network among the plurality of policy enforcement sections, wherein the policy determining section selects, on the basis of the network state, the policy enforcement section efficient for transfer of the user information among the policy enforcement sections that can execute the security measure corresponding to the policy information.

6. A security policy enforcement method comprising:

storing, in a policy storing section, policy information indicating a security measure to be executed on user information, each piece of the policy information including a service identifier and information on the security measure to be executed on the user information;

storing, in a measure-arrangement storing section, measure arrangement information indicating the security measure executable in each of a plurality of policy enforcement sections;

selecting, on the basis of, the service identifier transmitted from the client to the server along with the user information, the policy information and the measure arrangement information, one or more of the policy enforcement sections that execute the security measure on the user information on which the security measure has been executed among the plurality of policy enforcement sections, along with the service identifier;

storing load information indicating load states of the policy enforcement sections; and each of the one or more policy enforcement sections executing the security measure on the user information and outputting, on the basis of a selection result, the user information, on which the security measure has been executed, to the other policy enforcement sections among the one or more policy enforcement sections or to the server, along with the service identifier;

wherein a policy enforcement section having a smallest load state among the policy enforcement sections that can execute the security measure corresponding to the policy information is selected as a transfer destination of the user information, on the basis of the load information.

7. A non-transitory computer-readable storage medium storing a program for causing a computer to realize a function of selecting, on the basis of:

(i) policy information, stored in a policy storing section, indicating a security measure to be executed on user information, the user information being transmitted from a client to a server along with a service identifier identifying one of a plurality of services, and (ii) measure arrangement information, stored in a measure-arrangement storing section, indicating the security measure executable in each of a plurality of policy enforcement sections, and (iii) load information, stored in a load information storing section, indicating load states of the policy enforcement sections;

one or more of the policy enforcement sections that execute the security measure on the user information, and outputting, on the basis of the selection, the user information on which the security measure has been executed, to the other policy enforcement sections among the plurality of policy enforcement sections, along with the service identifier;

wherein a policy enforcement section having a smallest load state among the policy enforcement sections that can execute the security measure corresponding to the policy information is selected as a transfer destination of the user information, on the basis of the load information.

8. The security policy enforcement system according to claim 1, wherein the security measure includes at least one of an encryption, anonymization, log recording, conversion into a provisional identifier, and an anti-virus measure.

* * * * *